(12) United States Patent
Ross

(10) Patent No.: US 11,415,053 B2
(45) Date of Patent: Aug. 16, 2022

(54) FLOATING OFFSHORE CARBON NEUTRAL ELECTRIC POWER GENERATING SYSTEM USING OCEANIC CARBON CYCLE

(71) Applicant: Gary Ross, Brookshire, TX (US)

(72) Inventor: Gary Ross, Brookshire, TX (US)

( * ) Notice: Subject to any disclaimer, the term of this patent is extended or adjusted under 35 U.S.C. 154(b) by 0 days.

(21) Appl. No.: 16/635,088

(22) PCT Filed: Aug. 8, 2018

(86) PCT No.: PCT/US2018/045713
§ 371 (c)(1),
(2) Date: Jan. 29, 2020

(87) PCT Pub. No.: WO2019/032646
PCT Pub. Date: Feb. 14, 2019

(65) Prior Publication Data
US 2020/0263605 A1 Aug. 20, 2020

Related U.S. Application Data

(60) Provisional application No. 62/544,517, filed on Aug. 11, 2017.

(51) Int. Cl.
| | | |
|---|---|---|
| *F02C 7/20* | (2006.01) | |
| *E21B 41/00* | (2006.01) | |
| *B01D 53/02* | (2006.01) | |
| *B01D 53/14* | (2006.01) | |
| *B01D 53/22* | (2006.01) | |

(52) U.S. Cl.
CPC .......... *F02C 7/20* (2013.01); *E21B 41/0064* (2013.01); *B01D 53/02* (2013.01); *B01D 53/1475* (2013.01); *B01D 53/22* (2013.01); *B01D 2257/504* (2013.01); *F23R 2900/00* (2013.01)

(58) Field of Classification Search
CPC ....... F02C 7/20; B01D 53/02; B01D 53/1475; B01D 53/22; B01D 2257/504; F23R 2900/00
See application file for complete search history.

(56) References Cited

U.S. PATENT DOCUMENTS

| | | | | |
|---|---|---|---|---|
| 1,870,263 | A * | 8/1932 | Neff | B63G 8/12 114/338 |
| 5,964,985 | A * | 10/1999 | Wootten | B01D 53/24 201/14 |
| 6,406,219 | B1 * | 6/2002 | Nove | B01D 53/228 405/129.25 |
| 7,119,460 | B2 * | 10/2006 | Poldervaart | F17C 7/04 307/149 |
| 2008/0196410 | A1 * | 8/2008 | Primlani | F02C 1/05 60/641.15 |
| 2008/0231057 | A1 * | 9/2008 | Zeuner | F03B 17/065 290/54 |
| 2010/0230965 | A1 * | 9/2010 | Pitre | F03D 9/25 290/42 |

* cited by examiner

*Primary Examiner* — Sean Gugger

(57) ABSTRACT

An oceanic offshore system and method for generating electric power which comprises a structure positioned at an offshore location. A power generating module is mounted on the structure, the power generating module including a turbine, an electric power generator coupled to the turbine, and a generating source of power fluid for the turbine resulting from the combustion of a fossil fuel. There is a capture system connected to the generating source for transferring carbon dioxide combustion gases to a subsea location for sequestration of $CO_2$.

20 Claims, 4 Drawing Sheets

FLOATING OFFSHORE CARBON NEUTRAL ELECTRIC POWER GENERATING SYSTEM USING OCEANIC CARBON CYCLE

CROSS REFERENCE TO RELATED APPLICATION

This application claims priority to U.S. Application No. 62/544,517 filed on Aug. 11, 2017 the disclosure of which is incorporated herein by reference for all purposes.

FIELD OF THE INVENTION

The present invention relates to electric power generation and, in particular, floating offshore electric power generation utilizing artificial carbon dioxide capture and sequestration in the ocean.

BACKGROUND OF THE INVENTION

To date, electric power generation sources are nuclear, fossil fuels (coal, oil, natural gas), hydro, wind, wave, and solar. Fossil fuels have a carbon footprint (e.g., CO2), while all the other mentioned sources generally speaking have no such carbon footprint, i.e. they are carbon neutral.

With an increasing concern regarding climate change, electric power generating stations employing fossil fuels are being retrofitted or built with technologies to mitigate carbon footprint. However, currently there is no carbon neutral electric power generation facility employing fossil fuels. This has turned attention to the use of nuclear power for base load power generation (BLPG). However, nuclear power generation is considered by many to be a high-risk option as witnessed by disasters such as Chernobyl and Fukushima Daiichi in Japan.

SUMMARY OF THE INVENTION

In one aspect the present invention relates to the generation of electric power which is carbon neutral.

In another aspect, the present invention relates to the use of fossil fuels for the generation of electric power which is carbon neutral.

In yet another aspect, the present invention relates to the offshore generation of electric power.

In still a further aspect, the present invention relates to the generation of electric power utilizing the oceanic carbon cycle (OCC) to mitigate the atmospheric release of carbon dioxide.

These and further features and advantages of the present invention will become apparent from the following detailed description, wherein reference is made to the figures in the accompanying drawings.

DETAILED DESCRIPTION OF PREFERRED EMBODIMENTS

The present invention, in part, utilizes the part that the OCC plays in the overall carbon cycle. It is generally recognized that the ocean is a carbon sink since it takes up more carbon from the atmosphere than it gives out. Thus, carbon dioxide from the atmosphere dissolves in the waters of the ocean. While some of the carbon dioxide stays as dissolved gas, some is converted into other things. For example, photosynthesis by tiny marine plants (phytoplankton) in the sunlit surface water turn the carbon into organic matter. Further, many organisms use carbon to make calcium carbonate, the building material of shells and skeletons. Other chemical processes also create calcium carbonate in the water. The using up of carbon by biological and chemical processes allows more carbon dioxide to enter the water from the atmosphere. In short, carbon, e.g., from $CO_2$, incorporates itself into marine organisms as organic matter or as calcium carbonate.

There are predictions based on mathematical modelling that disposal of $CO_2$ into the surface ocean (<1 km depth) would permit equilibration with the atmosphere within a few years to decades and would therefore offer little advantage, but that disposal into ocean basins greater than 3 km in depth would delay equilibration with the atmosphere for several hundred years, eliminating the atmospheric concentration transient. Resultant interaction with calcite-rich sediments may reduce the long-term (>2000 year) atmospheric enrichment by a significant amount (~50%). In any event, many of the interactive processes between marine organisms and $CO_2$ could result in the locking up of carbon for millions of years. Further, $CO_2$ sequestration may be more efficient in colder oceanic waters since it is known that the solubility of carbon dioxide in water increases with decreasing temperature.

Figure 1:
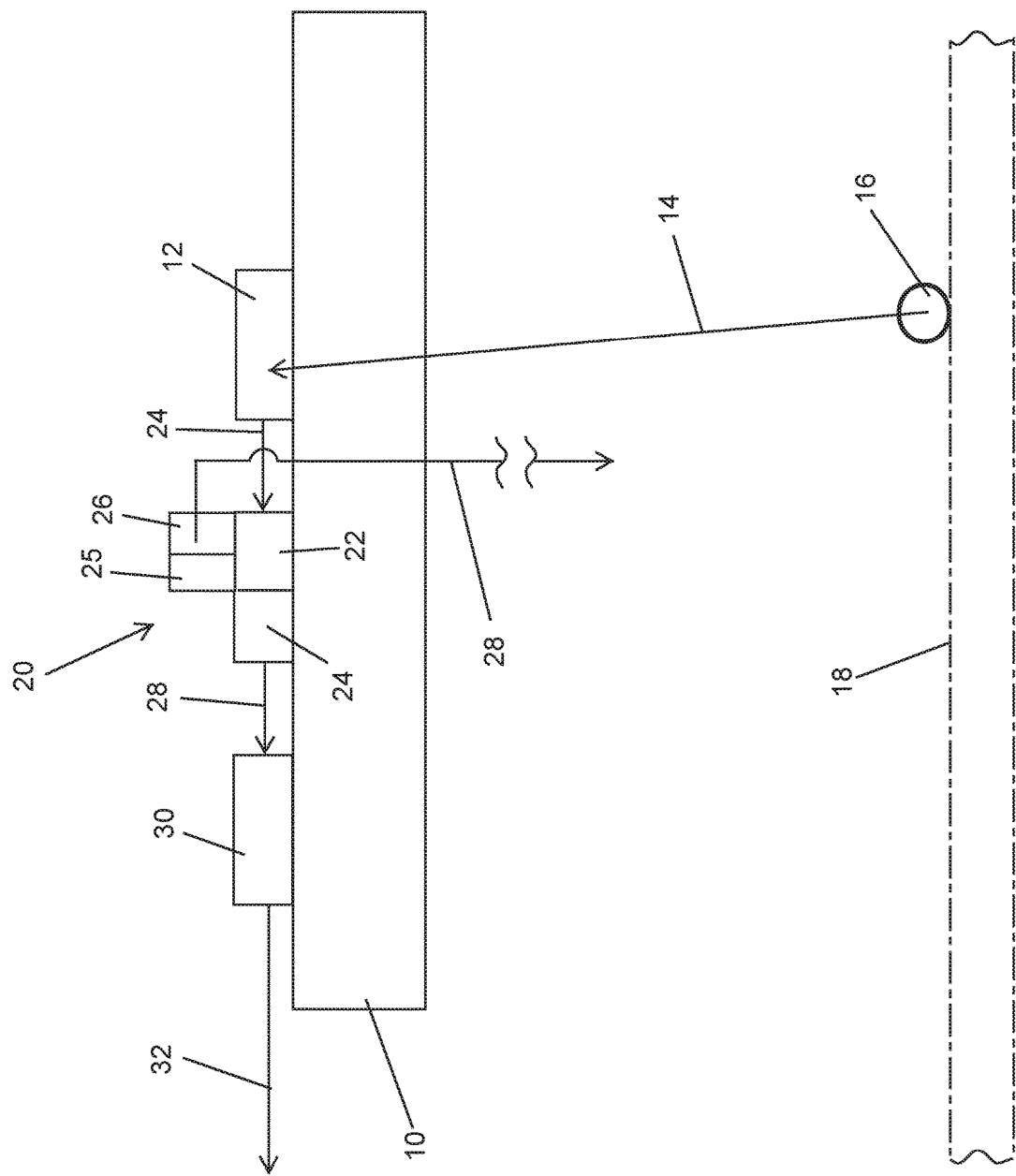
FIG. 1 is a simplified schematic view of one embodiment of the electric power generating system of the present invention.

Referring first to FIG. 1, there is shown a floating structure 10, which can be a barge, platform, or the like, and which can be dynamically or statically positioned at a suitable offshore location. The positioning of structure 10 in deep water can be accomplished using well known methods used in deep water positioning and mooring of drilling and production platforms in the oil and gas industry. Mounted on structure 10 is a gas processing/optimization module 12 which is connected by a conduit 14 to a pipeline 16 laying on the seabed 18. Generally speaking, gas pipeline 16 will be for the transport of light hydrocarbon gases, e.g., natural gas which contains primarily methane. In gas processing module 12, gas transferred from pipeline 16 and line 14 can be treated in various ways well known to those skilled in the art to remove unwanted contaminants, water, and other components that would deleteriously effect downstream operations. Module 12 can also include separation and enrichment systems to optimize BTU content of the gas from pipeline 16.

Also mounted on structure 10 is a power station module shown generally as 20 and which can comprise a driver, e.g., a gas turbine, or steam turbine, both of which are well known to those skilled in the art and both of which, in the present invention, would be powered directly or indirectly from the combustion of a fuel, e.g., processed natural gas transferred via line 24 from processing module 12. The combusted gas (flue gas) generated in the driver or power section 22 of module 20 is sent to a gas collection system comprised of a compression station 26 to compress the flue gas and transfer it to a conduit or line 28 to a subsea location at a desired optimal depth which can be in the sunlit waters of the ocean, but is preferably, for reasons discussed above, in a deeper ocean pool at about 3 km or greater below the ocean surface. In a preferred embodiment, prior to compression in compression station 26, the flue gas is sent to a carbon dioxide separation station 25 wherein the carbon dioxide is separated from the flue gas by absorption, adsorption, membrane gas separation, or other methods well known to those skilled in the art. The carbon dioxide only is then sent to compression station 26 and ultimately transferred to a subsea location by conduit 28. The non-carbon dioxide components of the flue gas are then processed and disposed with by means well known to those skilled in the art.

The turbine comprising driver 22 is mechanically connected in a well-known fashion to an electric power generator 24 whereby electric power is generated and transferred via line 28 to an electric power substation 30. Substation 30 will generally have switching, protection, and control equipment, and transformers, the output from substation 30 being transmitted via electric power transmission line 32 to a remote location, preferably on land where it can be distributed as needed.

Figure 2:
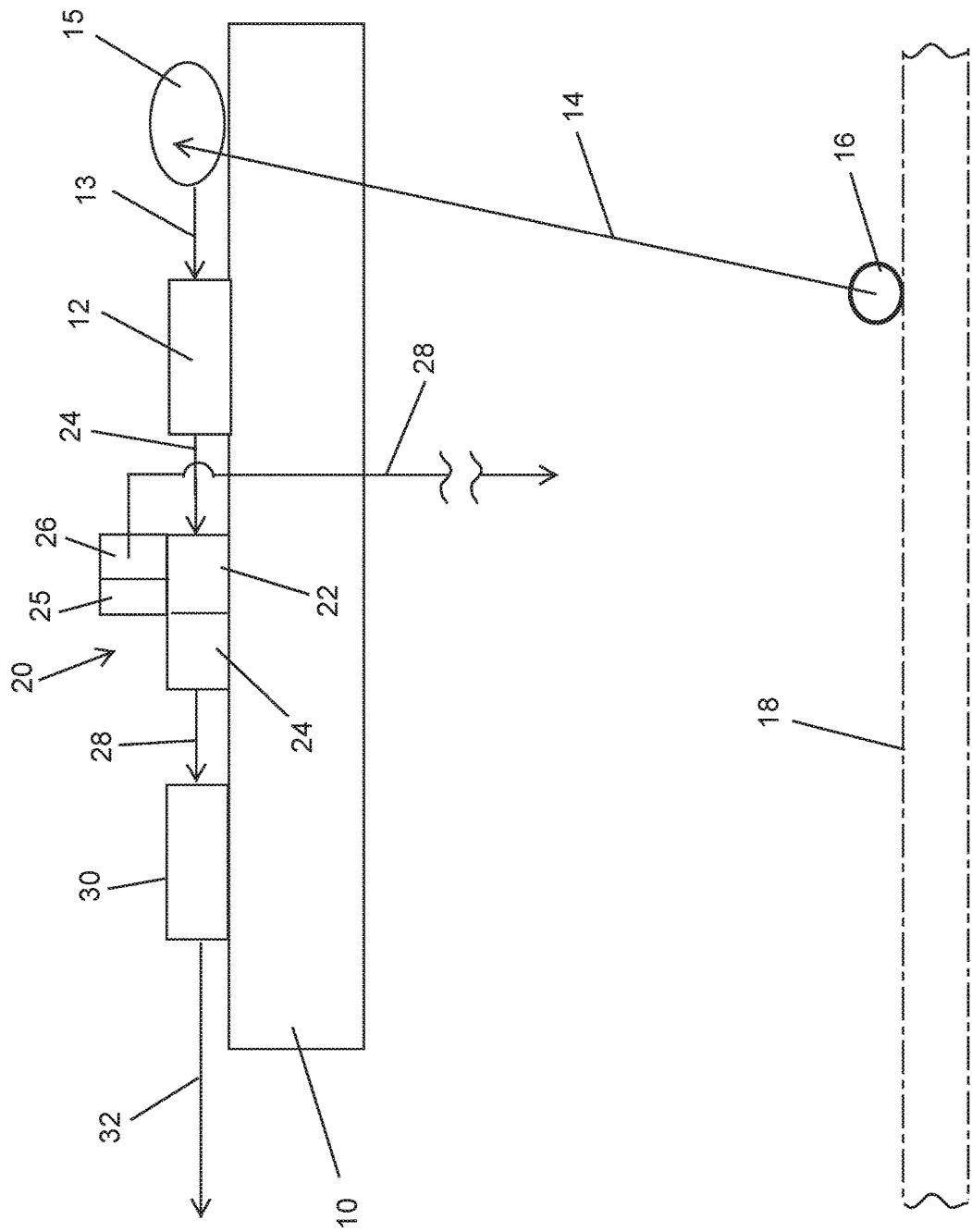
FIG. 2 is a view similar to FIG. 1 showing another embodiment of the present invention.

Turning now to FIG. 2, there is shown another embodiment of the present invention. The embodiment shown in FIG. 2 is substantially the same as that shown in FIG. 1 with the exception that gas from pipeline 16 is transferred via line 14 to a gas storage tank 15 positioned on structure 10. The gas in storage tank 15 is transferred via line 13 to gas processing module 12. In all other respects, the embodiment of FIG. 2 is the same and functions in the same manner as the embodiment of FIG. 1.

Figure 3:
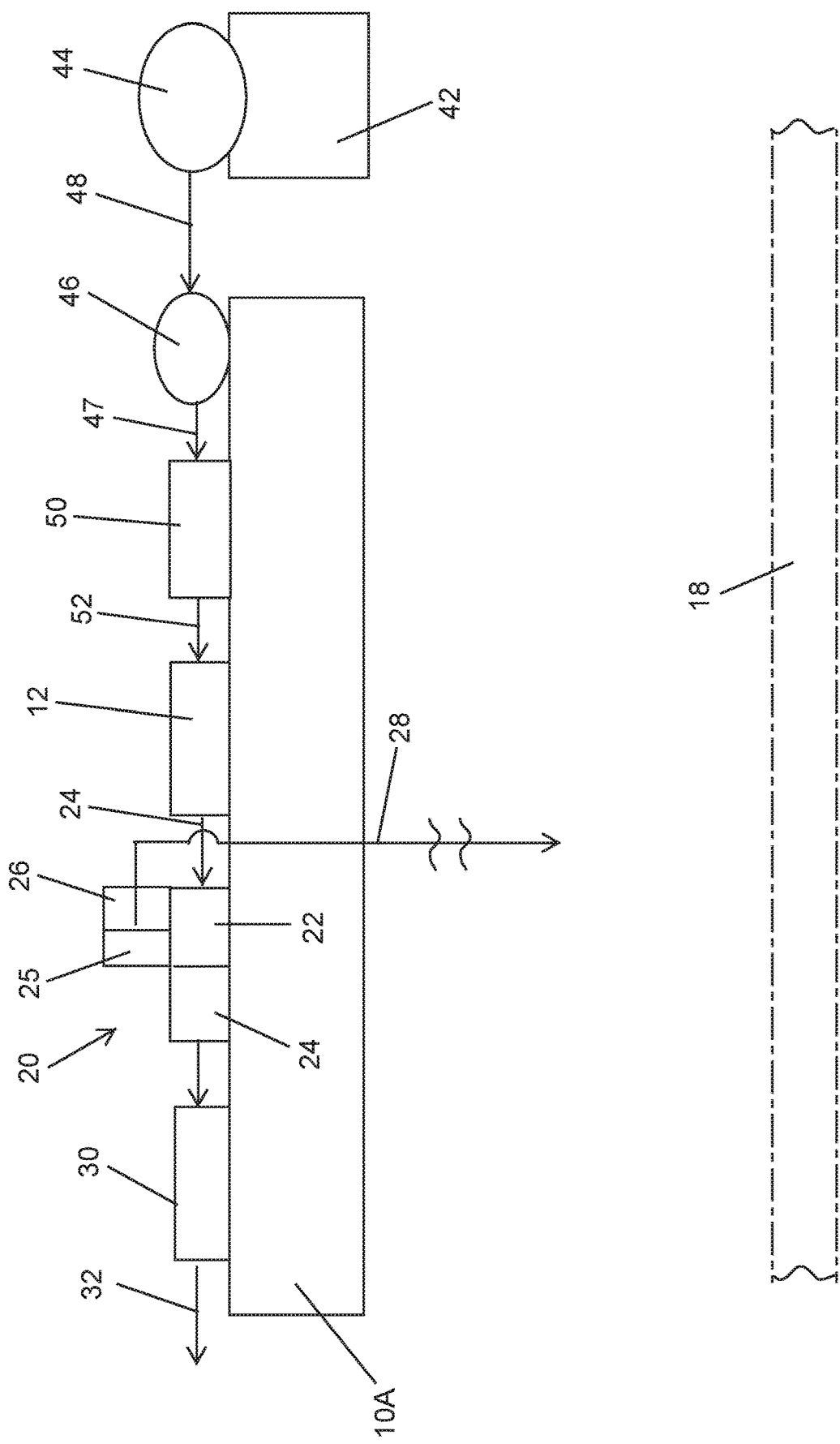
FIG. 3 is a view similar to FIG. 1 showing another embodiment of the present invention.

Turning now to FIG. 3, there is shown another embodiment of the present invention which is similar to the embodiments shown in FIGS. 1 and 2, with the exception it employs liquefied natural gas (LNG) as a fuel source. To this end, there is a barge or ship 42 which has a compartment or vessel 44 carrying LNG, the LNG being transferred form compartment 44 via line 48 to storage vessels 46 on structure 10. LNG is transferred via line 47 to a regasification module 50 and thereafter regasified liquid natural gas (RLNG) via line 52 to gas processing module 12. Using fuel injection technology, it may be possible for LNG to be used as a fuel, without regasification. In all other respects the, embodiment of FIG. 3 is the same and functions in the same manner as the embodiment of FIGS. 1 and 2.

Figure 4:
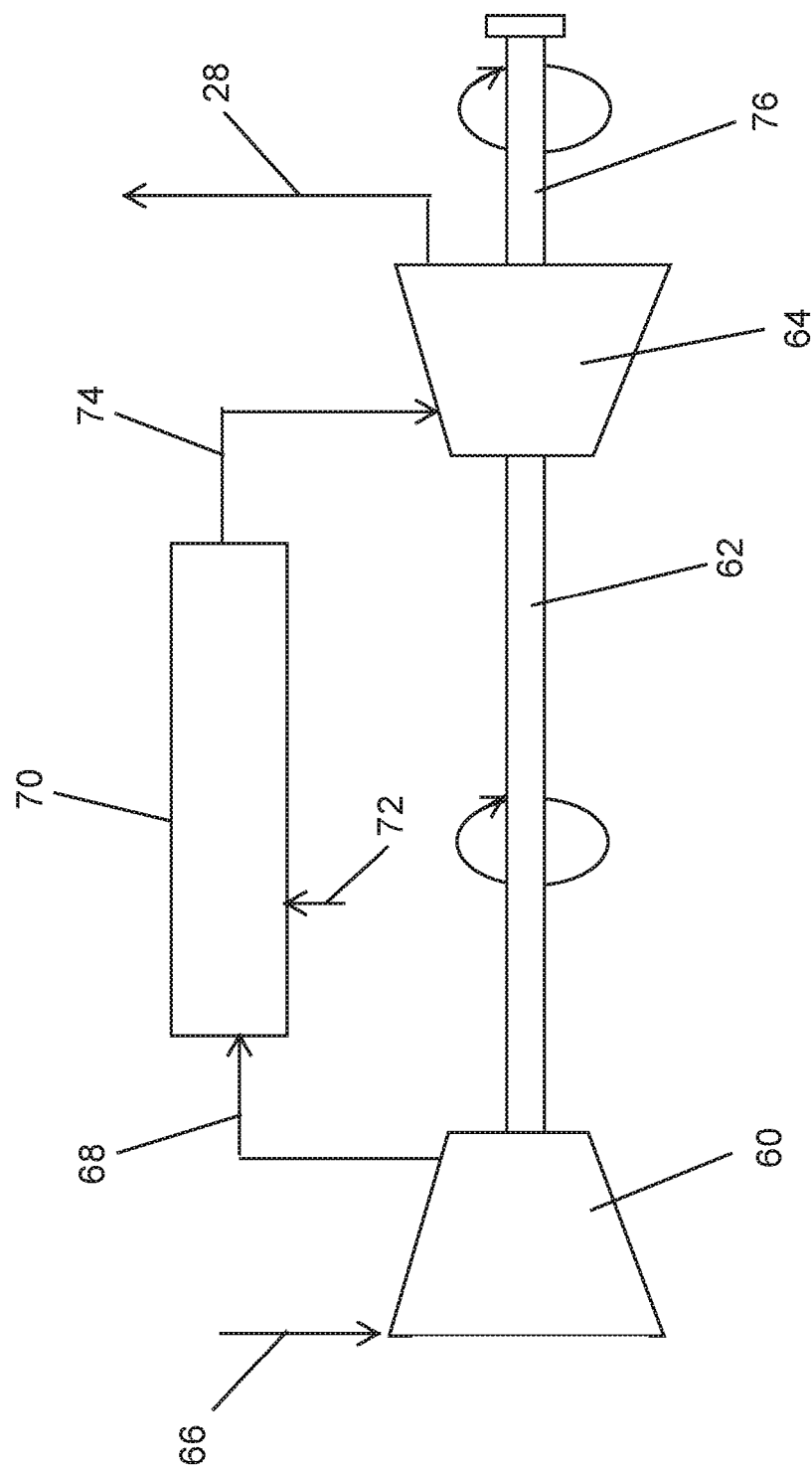
FIG. 4 is a simplified schematic view of a typical gas turbine system that can be employed in the system and method of the present invention.

Referring now to FIG. 4, there is shown a schematic layout of a typical gas turbine system that can be used in the power generating system and method of the present invention. The gas turbine system of FIG. 4 comprises a compressor 60, coupled by shaft 62 to a turbine 64. In a well-known manner, air is introduced into compressor 60 via line 66, the air being compressed and then transferred via line 68 to a combustion chamber 70 where it is admixed with a suitable fuel, e.g., natural gas, LNG, the fuel igniting in combustion chamber 70 to generate a high temperature, high pressure gas flow which is introduced via line 74 into turbine 64 to drive turbine 64 wherein it expands down to an exhaust pressure producing a shaft work output via shaft 76 which can then drive an electric power generator, e.g., generator 24. The carbon dioxide combustion gas from turbine 64 is then captured for transfer via line 28 for sequestration at a suitable depth below the surface of the ocean as described above with respect to the embodiments of FIGS. 1-3.

In the case of a steam turbine, the natural gas would be used to convert water to steam, the steam in turn being used to spin the turbine, the output shaft of the turbine being coupled to an electric generator as in the case of the gas turbine. It is further contemplated there could be combination of gas and steam turbines, similar to configurations on land based combined cycle power stations which are well known to those skilled in the art.

In all of the embodiments discussed above, either natural gas or LNG has been used as a fuel source. However, it is within the scope of the present invention for the fuel source to comprise oil, heating oil and other hydrocarbon liquids. Further, the fuel source could comprise coal which could be transferred by barge from the shore to the offshore structure, the coal forming fuel for a boiler generating steam to drive a steam turbine. While admittedly the use of coal poses greater combustion gas capture problems, there are known technologies for capturing combustion gases from the burning of coal or similar solid fossil fuels, which can trap noxious gases other than $CO_2$ and transfer the remaining $CO_2$ into the ocean as discussed above with respect to the embodiments shown in FIGS. 1-3. Such a system might be useful where conditions make it difficult to supply the system with natural gas, LNG, or other similar fluid fossil fuels, and wherein the adjacent land is rich in coal deposits. Further, waste paper products could also be used as a fuel source.

It is further contemplated that the carbon dioxide collection system may include systems for adding chemical additives, if required, prior to subsea transfer to mitigate potential for localized ocean acidification, due to point source oceanic sequestration of carbon dioxide.

As described above, the structure can be a floating structure similar to deepwater oil and gas offshore platforms, or a fixed structure similar to current, relatively shallow water oil and gas platforms, thereby forming a semi-permanent structure. However, the use of some type of floating structure is preferable since it allows the system to be transferred at will from one location to another to optimize cost considerations.

It will also be understood that feed stock and electric power or export connections will be of a type that could be quickly disconnected to allow the structure to be moved in the event of weather related events such as hurricanes.

It will be further understood that the power plant, depending upon what type of turbine(s) are employed can also comprise boilers, steam generators, pumps, and typical equipment used in onshore electric power generating stations and systems as well known to those skilled in the art.

It is further contemplated that the system could also include a separate vessel or structure having electric power storage capabilities.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A system for generating electric power comprising:
an oceanic offshore structure;
a gas processing and optimization module mounted on said ocean offshore structure, wherein said gas optimization module includes separation and enrichment systems; and an electric power generating system mounted on said oceanic offshore structure, said electric power generating system including:
an electric power generator;
a driver powered by a combustion process of a fossil fuel source, said driver being connected to said generator;
an electric power transmission system to transfer electricity from said generator to a remote location; and
a capture system connected to said driver for capturing combustion gasses transferred from said combustion process, enabling artificial carbon dioxide capture and ocean sequestration, said capture system comprising:
a flue gas separation station for separating the carbon dioxide from non-carbon dioxide combustion gases by absorption, adsorption, or membrane gas separation prior to compressing said carbon dioxide, wherein said non-carbon dioxide components of the flue gas are then processed and disposed of; and
a compression system for compressing said carbon dioxide prior to transferring said carbon dioxide to a subsea location.

2. The system of claim 1, wherein said oceanic offshore structure is fixed or floating.

3. The system of claim 1, wherein said fossil fuel source is supplied to said gas processing and optimization module on said oceanic offshore structure by a line connected to either:
a conduit connected to a seabed pipeline;
a gas storage tank connected by a conduit to a seabed pipeline; or
storage vessels connected by a line to a barge or ship.

4. The system of claim 1, wherein said driver is gas combustion turbines or a combination of gas and steam turbines.

5. The system of claim 1, wherein said oceanic offshore structure can disconnect fuel and transmission system connections for transit to a different location.

6. The system of claim 1, wherein said power generating system provide base load power generation to said remote location.

7. The system of claim 1, wherein said power generating system comprises a separate vessel or structure having electric power storage capabilities to enable continuous generation during operation of said power generating system.

8. The system of claim 1, further comprising said capture system adds chemical additives into said carbon dioxide combustion gases to mitigate localized ocean acidification.

9. The system of claim 1, further comprising said electric power generating system generates electric power utilizing the oceanic carbon cycle to mitigate the atmospheric release of carbon dioxide.

10. The system of claim 1, wherein said separation station introduces said carbon dioxide combustion gases to an area of sea water containing at least one of marine organisms, marine plants, and/or phytoplankton.

11. A method for generating electric power comprising:
positioning an oceanic offshore structure at an offshore location;
mounting a gas processing and optimization module on said structure, wherein said gas optimization module includes separation and enrichment systems; and
mounting an electric power generating system on said structure, said electric power generating system including:
an electric power generator;
a driver powered by a combustion process of a fossil fuel source, said driver being connected to said generator;
an electric power transmission system to transfer electricity from said generator to a remote location; and
capturing combustion gasses transferred from said combustion process with a capture system connected to driver, enabling artificial carbon dioxide capture and ocean sequestration, said capture system comprising:
a flue gas separation station for separating the carbon dioxide from non-carbon dioxide combustion gases by absorption, adsorption, or membrane gas separation prior to compressing said carbon dioxide, wherein said non-carbon dioxide components of the flue gas are then processed and disposed of; and
a compression system for compressing said carbon dioxide prior to transferring said carbon dioxide to a subsea location.

12. The method of claim 11, wherein said oceanic offshore structure is fixed or floating.

13. The method of claim 11, wherein said fossil fuel source is supplied to said gas processing and optimization module on said oceanic offshore structure by a line connected to either:
a conduit connected to a seabed pipeline;
a gas storage tank connected by a conduit to a seabed pipeline; or
storage vessels connected by a line to a barge or ship.

14. The method of claim 11, wherein said driver is gas combustion turbines or a combination of gas and steam turbines.

15. The method of claim 11, wherein said oceanic offshore structure can disconnect fuel and transmission system connections for transit to a different location.

16. The method of claim 11, wherein said power generating system provides base load power generation to said remote location.

17. The method of claim 11, further comprising a separate vessel or structure having electric power storage capabilities to enable continuous generation during operation of said power generating system.

18. The method of claim 11, further comprising adding chemical additives into said carbon dioxide combustion gases to mitigate localized ocean acidification.

19. The method of claim 11, further comprising generating said electric power utilizing the oceanic carbon cycle to mitigate the atmospheric release of carbon dioxide.

20. The method of claim 11, wherein said separation station introduces said carbon dioxide combustion gases to an area of sea water containing at least one of marine organisms, marine plants, and/or phytoplankton.

* * * * *